United States Patent
Kohn et al.

(10) Patent No.: US 9,522,355 B2
(45) Date of Patent: Dec. 20, 2016

(54) FILTER UNIT

(71) Applicant: Camfil AB, Trosa (SE)

(72) Inventors: Joshua Kohn, Laval (CA); Erik Lans, Trosa (SE)

(73) Assignee: CAMFIL AB, Trosa (SE)

( * ) Notice: Subject to any disclaimer, the term of this patent is extended or adjusted under 35 U.S.C. 154(b) by 0 days.

(21) Appl. No.: 14/348,726

(22) PCT Filed: Sep. 28, 2012

(86) PCT No.: PCT/EP2012/069227
§ 371 (c)(1),
(2) Date: Mar. 31, 2014

(87) PCT Pub. No.: WO2013/045637
PCT Pub. Date: Apr. 4, 2013

(65) Prior Publication Data
US 2014/0237957 A1 Aug. 28, 2014

(30) Foreign Application Priority Data

Sep. 29, 2011 (WO) ............... PCT/EP2011/066991

(51) Int. Cl.
*B01D 46/00* (2006.01)
*B01D 46/02* (2006.01)
(52) U.S. Cl.
CPC .......... *B01D 46/023* (2013.01); *B01D 46/002* (2013.01); *B01D 46/0016* (2013.01);
(Continued)
(58) Field of Classification Search
CPC . B01D 46/023; B01D 46/0016; B01D 46/002; B01D 46/0023; B01D 46/0024; B01D 46/02; B01D 2275/203
(Continued)

(56) References Cited

U.S. PATENT DOCUMENTS

| 3,396,517 | A * | 8/1968 | Schwab | B01D 46/0024 55/368 |
| 2003/0145566 | A1 * | 8/2003 | Parks | A47L 9/14 55/382 |
| 2004/0163370 | A1 * | 8/2004 | Haufe | B01D 46/0005 55/483 |

FOREIGN PATENT DOCUMENTS

| CN | 2320942 | 5/1999 |
| CN | 2662979 | 12/2004 |

(Continued)

OTHER PUBLICATIONS

International Search Report for PCT/EP2012/069227 dated Jan. 1, 2013.
(Continued)

*Primary Examiner* — Thomas Bennett McKenzie
(74) *Attorney, Agent, or Firm* — Harness, Dickey & Pierce, P.L.C.

(57) ABSTRACT

A filter unit comprising a filter bag for removing particles from an air or gas flow, wherein the filter unit is arranged to receive at least one filter pocket and the filter bag comprises an opening portion and an end portion opposite said opening portion. The filter unit further comprises a frame arranged at a periphery of the opening portion, and a support structure arranged at the periphery of the end portion for stretching an area of the end portion. The frame and the support structure act to stretch the filter bag into a substantially parallelepiped shape such that the filter unit is arranged to provide a free passage for the at least one filter pocket into and out of said filter bag. Furthermore, the filter unit is arranged to fold between the frame and the support structure into a folded state.

25 Claims, 5 Drawing Sheets

(52) U.S. Cl.
CPC ..... *B01D 46/0023* (2013.01); *B01D 46/0024* (2013.01); *B01D 46/02* (2013.01); *B01D 2275/203* (2013.01)

(58) Field of Classification Search
USPC ............. 55/341.1–341.7, 361–382, 482–519
See application file for complete search history.

(56) References Cited

FOREIGN PATENT DOCUMENTS

| | | |
|---|---|---|
| CN | 101524601 | 9/2009 |
| JP | 2001-140629 A | 5/2001 |
| WO | WO-2009/084725 A1 | 7/2009 |
| WO | WO-2011/000437 A1 | 1/2011 |

OTHER PUBLICATIONS

International Preliminary Report on Patentability dated Apr. 10, 2014 issued in corresponding International Application No. PCT/EP2012/069227.
Chinese Office Action dated May 28, 2015, issued in corresponding Chinese Application No. 201280058518.X.

* cited by examiner

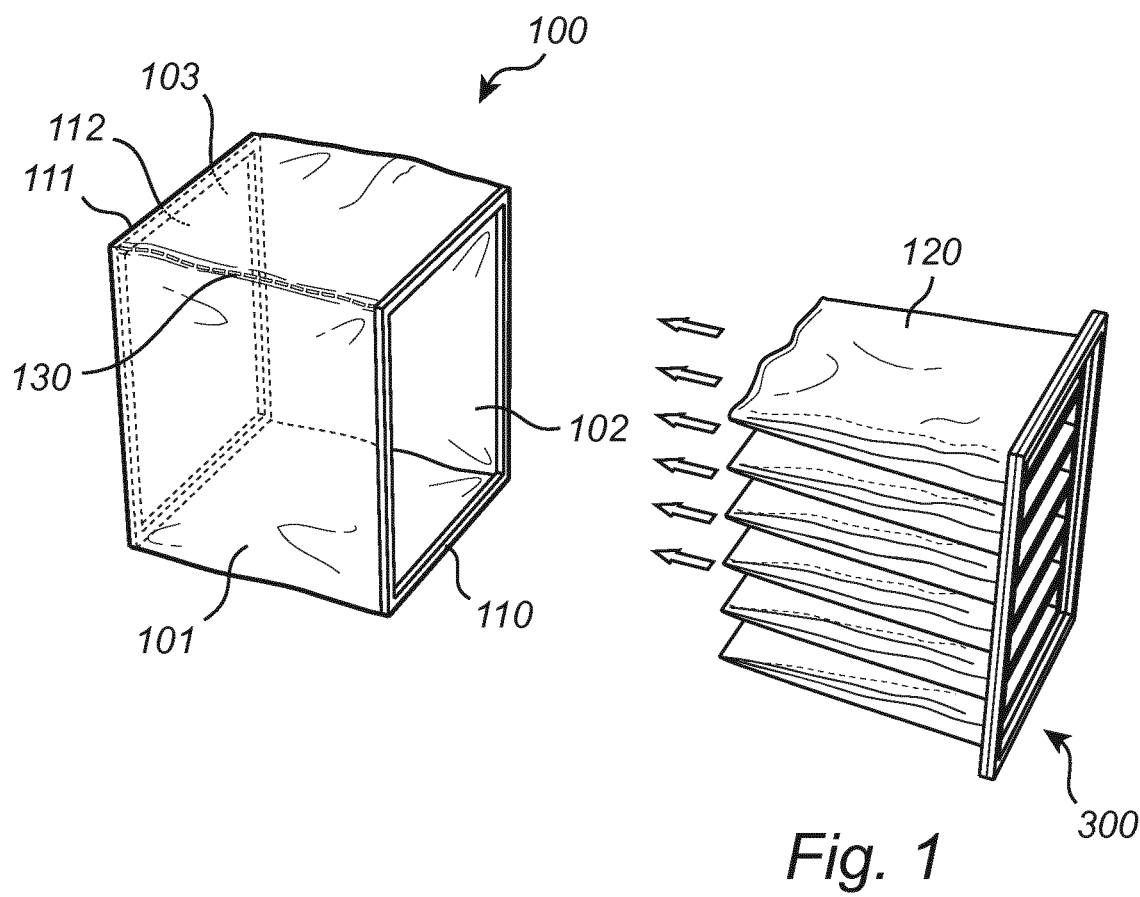
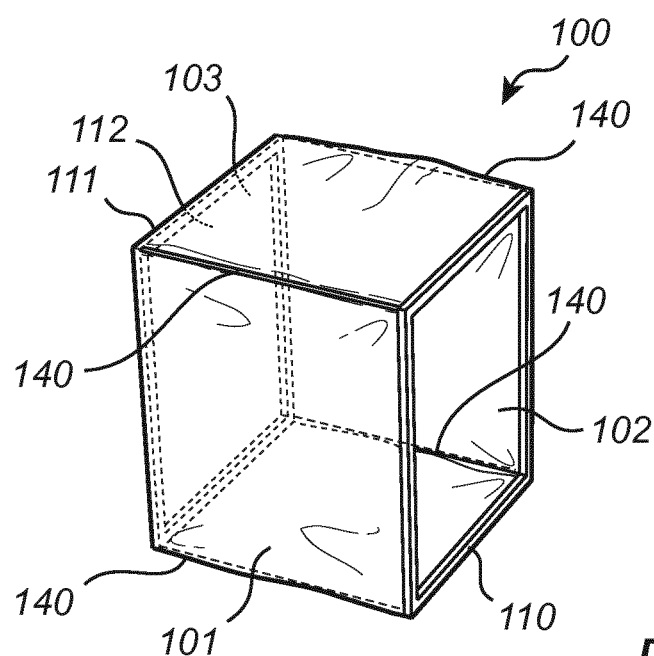
Fig. 1
Fig. 2a

FILTER UNIT

This application is a national phase under 35 U.S.C. §371 of PCT International Application No. PCT/EP2012/069227 which has an International filing date of Sep. 28, 2012, which claims priority to PCT/EP2011/066991 filed Sep. 29, 2011; the entire contents of each of which are hereby incorporated by reference.

FIELD OF THE INVENTION

The present invention relates to a filter unit for removing particles from an air or gas flow, wherein the filter unit may be provided in any air treatment system, e.g. in an air intake device of a gas turbine.

BACKGROUND OF THE INVENTION

Filters are often used to remove solid particles such as e.g. dust, pollen, mold, or sand from an air flow. Especially in applications where air quality is important, notably in building ventilation systems and in engines, filters are often indispensible for the provision of clean air. For example, gas turbines are generally operated with filters for removing particles from an air or gas flow, such that particles are hindered to enter the turbine. With this, potential damage risks such as e.g. turbine fouling, corrosion, and adhesion of the particles to the rotor blades in the gas turbine air compressing device may be impeded. Thus, the filters are provided to maintain the functionality of an electricity generation output from the gas turbine. The filters used are often of a pocket filter type, having a series of filter pockets attached to a frame structure. The filter pockets may be made of e.g. glass fiber, polypropylene, polyester, spunbonded fabric or the like.

After a certain time of operation, dependent on the ambient conditions in which the gas turbine operates, a large quantity of accumulated particles in the filters deteriorate the function of the intake device. In other words, the air or gas flow resistance increases which may, as a consequence, result in an electricity output loss of the gas turbine. Moreover, other ambient conditions such as sand storms, snow storms, rain, heat, cold, or the like may negatively affect the performance of the filters.

In the above-mentioned, or other, situations, the filters may have to be replaced to regain the sought air filter efficiency. However, a filter replacement may raise several problems. If the filter is removed from an intake device during gas turbine operation, the prevention of particles entering the gas turbine at the air intake is impaired. Such a particle intrusion into the gas turbine may lead to a deteriorated gas turbine operation, costly maintenance, and/or possibly, a gas turbine breakdown. On the other hand, the gas turbine may be switched off such that a filter replacement may be made when the gas turbine is not operating, thereby avoiding some problems related to the deteriorating effects of a gas turbine operation without any filter. However, this approach leads to other problems, as ruptures in gas turbine operation usually are cumbersome and problematic. Furthermore, a gas turbine switch-off, leading to an operation standstill, is associated with an economic loss.

In WO 2011/000437, a pocket filter assembly for particle removal is disclosed. The assembly comprises a filter unit and a pre-filter unit, each having a plurality of filter pockets, wherein the filter pockets of the pre-filter unit are arranged within the filter pockets of the filter unit. The disclosed arrangement enables a pre-filter removal from and insertion into the filter unit such that the filter unit may be kept in the in the pocket filter assembly during machine operation, while the pre-filter unit is removed from the filter unit. The pocket filter assembly further comprises metal bars arranged along the filter unit sides such that sideway flexing of the filter pockets of the filter unit is hindered. However, as the handling of the pocket filter assembly disclosed may be relatively cumbersome, alternative solutions for a more convenient arrangement for particle removal may be of interest.

SUMMARY OF THE INVENTION

It is an object of the present invention to provide a filter arrangement which is arranged to enable a convenient filter replacement during operation, which is convenient to handle and/or which mitigates a sideway flexing/bulging of the filter arrangement.

This and other objects are achieved by providing a filter unit having the features defined in the independent claim. Preferred embodiments are defined in the dependent claims.

According to the present invention, this is realized by a filter unit comprising a filter bag for removing particles from an air or gas flow, wherein the filter unit is arranged to receive at least one filter pocket, and the filter bag comprises an opening portion and an end portion opposite the opening portion. The filter unit further comprises a frame arranged at a periphery of the opening portion, and a support structure arranged at the periphery of the end portion for stretching an area of the end portion. The frame and the support structure act to stretch the filter bag into a substantially parallelepiped shape such that the filter unit, in a stretched state, is arranged to provide a free passage for the at least one filter pocket into and out of the filter bag. Furthermore, the filter unit is arranged to fold between the frame and the support structure into a folded state.

Thus, the present invention is based on the idea of providing a filter unit wherein the frame and the support structure act to stretch the filter bag into a substantially parallelepiped shape such that a free passage is provided for filter pocket insertion into, and removal from, the filter unit. Furthermore, the filter unit is foldable between the frame and the support structure into a folded state for storage and/or transportation purposes.

An advantage of the present invention is that the frame and the support structure, by acting to stretch the filter bag into a substantially parallelepiped shape, facilitate a filter pocket insertion/removal into/from the filter unit by providing a free passage of the one or more filter pockets. Thus, the filter unit simplifies a pocket filter insertion and removal during a pocket filter replacement, repair, or the like, while the filter bag may be retained during machine operation for filtering the air or gas flow, thereby preventing particles and/or large obstacles from entering the machine, e.g. the turbine. In other words, the filter unit enables an easy, convenient and uncomplicated operation related to the pocket filter insertion and removal. This is highly beneficial, especially in cases wherein filters need to be replaced frequently, e.g. filters for gas turbines operating in extreme conditions.

Furthermore, a more easily conducted pocket filter insertion/removal has the consequence that several problems related to entire filter removals, which may otherwise be necessary during filter replacements, may be circumvented. For example, a switch-off of the machine for which the filter is provided and/or a risk of damaging the machine due to particle intrusion if no filter is present, may be avoided.

The filter unit is further advantageous in that the filter unit, during non-operation, is easily and conveniently foldable between the frame and the support structure. The filter unit may fold/collapse/compress into a folded state merely by gravitation, i.e. that the filter unit may fold itself, if the filter unit is placed on its frame (or, analogously, on its support structure) e.g. on the floor, wherein the plane of the frame/support structure is parallel with the plane of the floor. Alternatively, by applying a force (pushing) on the frame towards the support structure, e.g. by hand, the filter unit folds/collapses/compresses into a folded state. The feature of an easily foldable filter unit is highly beneficial e.g. for storage and/or transportation purposes, as the filter unit in its folded state is thin, easy to handle, has a low freight volume and is easily stowable and/or stackable.

Another advantage of the present invention is that the frame and the support structure, acting to stretch the filter bag, provide that the filter unit is arranged to receive/accommodate the one or more filter pockets deep within the filter bag of the filter unit. By this, the filter performance is ameliorated, as the depth of the one or more filter pockets in the filter bag of the filter unit provides a large pre-filter pocket area for an air or gas flow filtering. This is realized as filter pockets with more shallow depths may lead to an inferior filter functionality. Thus, the filter efficiency of removing particles from an air or gas flow with the filter unit as described here, is enhanced.

Another advantage of the present invention is that the frame and the support structure, acting to stretch the filter bag, provide an arrangement wherein supplementary elements such as e.g. bars and/or rigid frameworks for retaining the shape of the filter bag, may be refrained from. Hence, the filter unit of the present invention provides a light, easily handled and convenient arrangement for air and/or gas filtration, which further is foldable during non-operation. Furthermore, the filter unit may have a longer service life compared to arrangements comprising bar and/or rigid framework constructions, as arrangements of this kind, often comprising welded metal structures, are more prone to vibration damage. Moreover, due to its relative simplicity compared to more bulky/large constructions of the mentioned kind, the manufacture of the filter unit becomes relatively inexpensive.

The present invention is further advantageous in that the frame and the support structure, acting to retain the shape of the filter bag, mitigates a bulging of the filter bag. In other words, the filter unit avoids a bulging deformation of the filter bag during operation, wherein such a deformation may deteriorate the filter efficiency of the filter unit. Furthermore, in a case filter units are arranged adjacently, e.g. in a pocket filter arrangement comprising a plurality of filter units, the filter units of the present invention act to avoid a contact between adjacently arranged filter bags units during operation. As a contact of this kind may lead to a decreased filter efficiency and/or an increased wear of the filter bags, the filter unit provides the advantage of an even further enhanced filter unit efficiency and/or prolonged service life of the filter unit.

The filter unit comprises a filter bag for removing particles from an air or gas flow, wherein the filter unit is arranged to receive at least one filter pocket. By the terms "at least one filter pocket" (hereafter denoted "filter pockets"), it is here meant one or more filter pockets, e.g. a set of filter pockets, which may be arranged adjacently and perpendicular to the direction of the air or gas flow. The filter bag of the filter unit is arranged to receive/accommodate the filter pockets, wherein the filter pockets are arranged to extend within the filter bag at least a major part of the length thereof.

The filter bag comprises an opening portion and an end portion opposite the opening portion. By "opening portion" it is here meant the mouth of the filter bag, whereas the "end portion" may be construed as the bottom/base portion of the filter bag.

The filter unit further comprises a frame arranged at a periphery of the opening portion of the filter bag. In other words, the frame is arranged around the filter bag opening/mouth for providing an unobstructed passage of air or gas flow into the filter bag, and to firmly hold the periphery of the filter bag opening/mouth. The filter bag is preferably attached to the frame in an air tight or essentially air tight manner. Furthermore, the filter unit comprises a support structure arranged at the periphery of the end portion for stretching an area of the end portion. By "support structure" it is here meant a structure which supports/holds/reinforces/stiffens the periphery of the filter bag end portion. The support structure stretches an area of the end portion, wherein the area may be e.g. rectangular or quadratic. In other words, the support structure stretches the end/bottom/base portion of the filter bag into a flat, rectangular/quadratic end portion of the filter bag.

The frame and the support structure act to stretch the filter bag into a substantially parallelepiped (e.g. cubic) shape. In other words, the frame and the support structure act to support/hold/reinforce/stiffen the filter bag such that it takes on, or at least strives to form, a parallelepiped/cubic shape. In this stretched state of the filter unit, it is arranged to provide a free passage, i.e. an unobstructed entry/path, for the filter pockets into and out of the filter bag during filter pocket replacement.

The filter unit is arranged to fold between the frame and the support structure into a folded state. In other words, the filter unit is arranged to fold into a folded state when a force is applied between the frame and the support structure, i.e. in a direction from the frame to the support structure. The force may result merely from gravity, i.e. that the filter unit may fold/collapse/compress into a folded state by itself, under its own weight, if the filter unit is placed on its frame (or, analogously, on its support structure) e.g. on the floor, wherein the plane of the frame/support structure is parallel with the plane of the floor. Alternatively, the filter unit may fold between the frame and the support structure by hand force, or the like, such that an operator may easily and effortlessly fold/press the frame at the opening portion towards the support structure at the end portion (or vice versa). The filter unit has the property of being foldable for purposes of storage/transportation, i.e. before insertion into and/or after removal of the filter unit from the machine for which it is provided.

According to an embodiment of the present invention, the filter unit may further comprise a lateral support structure arranged along at least a portion of a side of the filter bag between the opening portion and the end portion of the filter bag. The lateral support structure acts to stretch the filter bag along at least a portion between the opening portion and the end portion of the filter bag. The lateral support structure is thereby arranged to support one or more sides of the filter bag such that the filter bag is arranged to form/keep/retain/strengthen its geometric shape. The present embodiment is advantageous in that the lateral support structure contributes to the formation of the filter bag into (or retention of the filter bag in) the substantially parallelepiped shape. By this, the lateral support structure further contributes to provide a free passage for the filter pockets into/from the filter unit, thereby even further facilitating the insertion/removal of filter pockets e.g. during filter pocket replacement, repair, or the like.

Furthermore, the present embodiment is advantageous in that the lateral support structure is arranged to hinder sideway flexing of the filter bag of the filter unit. The lateral support structure counteracts e.g. filter bag bending and/or folding during operation, which possibly could be subjected to the filter bag in the absence of the lateral support structure. The lateral support structure hereby provides the advantage of an even further improved filtering effect, as a filter bag bending, folding, or the like, may deteriorate the filtering properties and/or reduce the efficiency of removing particles from an air or gas flow. Moreover, by mitigating a sideway flexing of the filter bag of the filter unit, as proposed by the lateral support structure, the advantage of a contribution to the service life of the filter unit and/or the filter pockets, which are to be received by the filter unit, is provided. This is realized as a sideway flexing of the filter bag of the filter unit may increase the filter unit and/or filter pocket wear as a result of e.g. bending fatigue of the filter bag and/or interference with the filter pockets during operation.

According to an embodiment of the present invention, the lateral support structure may comprise a weld, seam, or a combination thereof, of the filter material of the filter bag. The present embodiment is advantageous in that the weld and/or seam provides a reinforcement/strengthening of the at least a portion of the side of the filter bag without the necessity of providing auxiliary/reinforcing elements for this purpose. In other words, by a weld and/or seam of the filter material of the filter bag, the filter unit may in this embodiment refrain from auxiliary/reinforcing elements such as e.g. metal bars between the opening portion and the end portion of the filter bag.

The present embodiment is advantageous in that the welds/seams even further contribute to form/keep/retain/strengthen the parallelepiped shape of the filter bag and, consequently, to provide a free passage for the filter pockets into/from the filter unit. The present embodiment is further advantageous in that the filter unit comprising welds/seams is foldable, or at least more easily foldable, compared to arrangements with e.g. rigid/stiff auxiliary/reinforcing elements. Furthermore, the present embodiment is advantageous in that a lighter, more easily disposable and/or more convenient filter unit may be provided.

According to an embodiment of the present invention, the lateral support structure may further comprise at least one resilient element. By the term "resilient", it is here meant flexible, springing, elastic, or the like. In its relaxed (unbiased) state, the resilient element (or elements) of the lateral support structure may elongate between the opening portion and the end portion of the filter bag. The present embodiment is advantageous in that the resilient element is arranged to resiliently yield in a direction between the opening portion and the end portion of the filter bag, such that the filter unit is arranged to fold into between the frame and the support structure into the folded state. When unfolding the filter unit, e.g. for insertion into a machine, the biased/folded resilient element(s) of the lateral support structure is (are) arranged to flex/spring back into an elongated form. Consequently, the resilient elements even further contribute to the stretching of the filter bag in the substantially parallelepiped shape such that the filter unit is arranged to provide a free passage for the filter pockets into and out of the filter bag.

According to an embodiment of the present invention, the at least one resilient element may be arranged within a seam of the filter material of the filter bag. The present embodiment is advantageous in that the resilient element(s) is (are) conveniently arranged in the filter material of the filter bag, i.e. in the periphery of the filter bag interior, such that the resilient element(s) is (are) not obstructive when the filter pockets are to be arranged into the filter bag of the filter unit. Furthermore, during folding of the filter unit, the seam(s) retain the resilient element(s), thereby providing the advantage of a convenient folding of the filter unit.

According to an embodiment of the present invention, the lateral support structure may comprise at least one lateral element which elongates in a direction parallel to the direction of the air or gas flow and elongates between the frame and the support structure. The present embodiment is advantageous in that the at least one lateral element even further supports the stretching of the filter bag, and furthermore enhances the retaining of the shape of the filter bag. Moreover, the at least one lateral element mitigates a bulging deformation of the filter bag during operation. In other words, the lateral element inhibits a bulging of the portion of the filter bag where the lateral element is provided. As a deformation of this kind of the filter bag may deteriorate the filtering efficiency of the filter unit, the lateral element(s) contributes to an improved filter operation. Furthermore, in a case filter units are arranged adjacently, e.g. in a filter unit arrangement, the at least one lateral element of the lateral support structure acts to avoid a contact between adjacently arranged filter bags units during operation. As a contact between filter bags may lead to a decreased filter efficiency and/or an increased wear of the filter bags, the at least one lateral element of the filter unit provides the advantage of an even further enhanced filter unit efficiency and/or prolonged service life of the filter unit.

According to an embodiment of the present invention, the at least one lateral element may be in one piece. In other words, the one-piece lateral element of the present embodiment may consist of a single element. The present embodiment is advantageous in that the one-piece lateral element is able to stretch the filter bag and/or retain the shape of the filter bag to an even higher extent compared to arrangements comprising multiple parts or components connected by connections, joints, or the like.

According to an embodiment of the present invention, the at least one lateral element may be arranged along at least one side of the filter bag. The present embodiment is advantageous in that the sides, i.e. the portions of the filter unit between the edges of the filter unit, are more prone to a bulging deformation during operation compared to other parts of the filter unit. Hence, the arrangement of one or more lateral elements along one or more sides of the filter unit contributes to an even more improved stability of the filter unit.

According to an embodiment of the present invention, the at least one lateral element may be arranged along at least one outer side of the filter bag. The present embodiment is advantageous in that the lateral element(s) hereby efficiently inhibits a bulging of the side of the filter bag. This is understood as the lateral element(s) on the outer side(s) of the filter bag counteracts the pressure on the filter bags from the inner portion of the filter bag by the air or gas flow during operation.

Alternatively, according to another embodiment of the present invention, the at least one lateral element may be arranged along at least one inner side of the filter bag, and wherein the filter bag is attached to the at least one lateral element. It will be appreciated that the attachment of the filter bag to the lateral element(s) may be provided by one or more threads, seams, or the like. The present embodiment is advantageous in that the lateral element(s) hereby mitigates a bulging of the side(s) of the filter bag.

According to an embodiment of the present invention, the at least one lateral element may be arranged within a seam of the filter material of the filter bag. The present embodiment is advantageous in that the lateral element(s) is (are) conveniently arranged in the filter material of the filter bag, such that the lateral element(s) is (are) not obstructive when the filter pockets are to be arranged into the filter bag of the filter unit. Moreover, the arrangement of the lateral element(s) in the seam of the filter material, i.e. in the filter material, implies that the lateral element(s) to an even further extent is able to restrict movements and/or bulging tendencies of the filter bag during operation, and that the arrangement further improves the stretching of the filter bag into a substantially parallelepiped shape. Furthermore, during folding of the filter unit, the seam(s) retain the lateral element(s), leading to a convenient folding of the filter unit.

According to an embodiment of the present invention, the at least one lateral element may be curved such that the lateral element is arranged to narrow the waist of the substantially parallelepiped shape of the filter bag. In other words, the lateral element(s) which elongates between the frame and the support structure is curved, and achieves a shape of the filter bag which, at least to some extent, resembles that of a time-glass. The present embodiment is advantageous in that the curved lateral element(s) increases the distance between the filter bags of adjacently arranged filter units, in a direction perpendicular to the direction of the air or gas flow. Hence, the present embodiment even further decreases the risk of filter bag contact during operation when a plurality of filter bags are arranged adjacently, e.g. in a pocket filter arrangement.

According to an embodiment of the present invention, the at least one lateral element may be resilient. The lateral element is hereby arranged to resiliently yield along its elongation, i.e. between the opening portion and the end portion of the filter bag, when pressure (e.g. by hand) is applied between the frame and the support structure to fold the filter unit into the folded state. The present embodiment is advantageous in that the resilient lateral element leads to a conveniently folded filter unit. When unfolding the filter unit, the biased/folded lateral element(s) of the lateral support structure is arranged to flex/spring back into an elongated form. Hence, the present embodiment is further advantageous in that the resilient lateral element even further contributes to the stretching of the filter bag in the substantially parallelepiped shape, such that the filter unit is arranged to provide a free passage for the filter pockets into and out of the filter bag.

According to an embodiment of the present invention, the frame may comprise a lightweight structure. By "lightweight structure", it is here meant a structure which comprises a light material and/or which comprises a profile which is light. The present embodiment is advantageous in that the frame provides a rigid and/or strong support for the opening portion of the filter bag of the filter unit where the frame is arranged, while still providing a light filter unit.

According to an embodiment of the present invention, the support structure may comprise a weld, seam, or a combination thereof, of the filter material of the filter bag. The present embodiment is advantageous in that the weld and/or seam provides a reinforcement/strengthening of the end portion of the filter bag based on the filter material itself. The present embodiment is advantageous in that the welds/seams even further contribute to the formation/retaining of the parallelepiped shape of the filter bag.

According to an embodiment of the present invention, the support structure may comprise at least one reinforcing element arranged within a seam of the filter material of the filter bag. By "reinforcing element", it is here meant substantially any element which may provide a reinforcement/stiffening/strengthening of the support structure. The present embodiment is advantageous in that the reinforcing element(s) of the support structure, arranged for stretching an area of the end portion of the filter bag, is (are) conveniently arranged in the filter material of the filter bag, i.e. in the periphery of the filter bag interior. Furthermore, in the present embodiment, the support structure is not obstructive when one or more filter pockets are to be arranged into the filter bag of the filter unit.

According to an embodiment of the present invention, the at least one reinforcing element may be a rod comprising metal, polymer, fiberglass, wood, cardboard or a combination thereof. The present embodiment is advantageous in that the rod may conveniently stretch the end area of the end portion of the filter bag, wherein the rod advantageously is light and has a relatively small diameter. The use of an organic material in the rod is further advantageous regarding recycling aspects. The present embodiment of the invention is further advantageous in that the support structure, comprising a rod, provides a convenient arrangement for forcing/pushing the support structure towards the frame (or vice versa) by hand upon folding of the filter unit into a folded state.

According to an embodiment of the present invention, the frame and the support structure may be rectangular and may have equal outer dimensions. The present embodiment is advantageous in that the rectangular shapes of the frame and the support structure, which act to stretch the filter bag into a substantially parallelepiped shape, improve the formation/stretching of the filter bag for that purpose. Consequently, the embodiment of the present invention even further contributes to the arrangement of providing a free passage for the filter pockets into and out of the filter bag. Furthermore, by having equal outer dimensions, the frame and the support structure provide the advantage of an even more convenient folding of the filter unit, wherein the filer unit may self-fold between the frame and the support structure or wherein the frame may be pushed/forced straight in the direction towards the support structure (or vice versa). Furthermore, the present embodiment provides the advantage that the frame and the support structure, in the folded state of the filter unit, may be arranged to abut each other, such that the embodiment provides a shape of the folded filter unit that becomes even more suitable for storage/transportation purposes.

According to an embodiment of the present invention, the end portion may be smaller than the opening portion such that the filter bag is tapered in a direction parallel to the direction of the air or gas flow. In other words, at least one side of the filter bag may be tapered in the air or gas flow direction such that the width of the filter bag decreases in a direction of the air or gas flow. The present embodiment is advantageous in that the filter unit is hereby able to increase the distance between filter bags of adjacently arranged filter units in a direction perpendicular to the direction of the air or gas flow. Hence, the present embodiment contributes to a decreased risk of filter bag contact during operation when a plurality of filter bags are arranged adjacently, e.g. in a pocket filter arrangement. The present embodiment is advantageous in that the filter unit hereby provides an even further enhanced efficiency of the filter unit and/or a prolonged service life of the filter unit. It will be appreciated that the present embodiment may be combined with the lateral support structure according to a previously described embodiment of the present invention, such that the filter unit is provided both with a tapered filter bag as well as a lateral support structure, which is advantageous in that a filter bag contact, in case of adjacently arranged filter units, is impeded even further. According to an example of a filter unit, the filter unit may comprise a tapered filter bag and at least one lateral element of the lateral support structure.

According to an embodiment of the present invention, the filter bag may have a truncated pyramid shape. By "truncated pyramid", it is here meant a shape wherein the opening portion of the filter bag is larger than the area of the end portion of the filter bag, that all sides are tapered in relation to a direction parallel to the direction of the air or gas flow, and that the opening portion and the end portion are arranged symmetrically in relation to each other in the direction of the air or gas flow. In a case a plurality of filter units are arranged adjacently, e.g. in a row or in a matrix to constitute a filter pocket arrangement, the truncated pyramid shape of the filter bag achieves an increased distance (e.g. wedge-shaped gaps) between the filter bags of adjacently provided filter units. Consequently, the filter unit of the present embodiment even further contributes to an avoidance of filter bag contact during operation, thereby increasing the filtering efficiency. To even further increase the effect of filter bag separation in a filter unit arrangement, the filter bag may comprise the combined features of a truncated pyramid shape and a lateral support structure (e.g. comprising at least one lateral element).

According to an embodiment of the present invention, the filter bag may have a truncated pyramid shape wherein the area of the end portion is 70-98%, and preferably 90-98%, of the area of the opening portion.

According to an embodiment of the present invention, the filter unit may further comprise means for attaching the frame to the support structure in the folded state. An advantage of the present embodiment is that the means for attaching the frame to the support structure may keep the filter unit in the folded state, thereby even further facilitating a storage/transportation of the filter unit. The present embodiment of the invention is particularly advantageous if the lateral support structure comprises a resilient element. In this case, the filter unit is folded by pushing/forcing the frame towards the support structure, e.g. by hand, such that the filter unit folds/collapses/compresses into a folded state which is biased by the resilient element. The means for attaching the frame to the support structure conveniently counteract the force from the resilient element and keep/retain the filter unit in the folded state, e.g. for storage/transportation purposes. When the filter unit is to be arranged for operation, e.g. arranged within a machine, the means for attaching the frame to the support structure may be unlocked such that the resilient element of the lateral support structure flex/spring back, and thereby act to stretch the filter bag of the filter unit.

According to an embodiment of the present invention, the frame may be arranged for a releasable connection of a pre-filter unit to the frame, wherein the pre-filter unit comprises at least one filter pocket arranged for insertion into the filter bag. By the term "pre-filter unit" it is here meant substantially any unit/arrangement comprising one or more filter pockets, e.g. a set of filter pockets, which may be arranged adjacently and perpendicular to the direction of the air or gas flow.

An advantage of the present embodiment is that the frame is arranged for a convenient connection and de-connection of the pre-filter unit. For example, the frame may be formed such that it matingly engages the pre-filer unit, e.g. by a snapping action, and/or that the frame is provided with magnets for attachment to the pre-filter unit, wherein the pre-filter unit preferably connects to the frame in an air tight or essentially air tight manner. Thus, the frame simplifies a connection (de-connection) of the pre-filter unit, wherein the one or more filter pockets of the pre-filter unit are inserted into (removed from) the filter bag of the filter unit. Hereby, the present embodiment even further facilitates a pocket filter insertion and/or removal during a pocket filter replacement, repair, or the like, while the filter unit may be retained during machine operation for filtering the air or gas flow.

According to an embodiment of the present invention, there is provided a pocket filter assembly for removing particles from an air or gas flow, comprising a filter unit and a pre-filter unit comprising at least one filter pocket arranged for insertion into the filter unit, wherein the pre-filter unit is arranged for releasable connection to the filter unit for enabling connection thereto and removal therefrom.

An advantage of the present embodiment is that the pocket filter assembly provides an arrangement wherein the filter unit may be kept in the pocket filter assembly during machine operation, while the pre-filter unit is connected to, or removed from, the filter unit, e.g. due to filter replacements, repairs, or the like. The frame and the support structure of the filter unit act to stretch the filter bag, thereby simplifying the insertion/removal of the pre-filter unit into/from the filter. The pocket filter assembly is advantageous in that it may still provide a functional filter performance at machine operation although the pre-filter unit is removed from the assembly, wherein the filter unit remains in the assembly for the filtering operation. Consequently, several problems may be avoided related to filter maintenance such as e.g. switching off the machine for which the filter is provided or running the risk of damaging the machine due to particle intrusion if no filter is present. Thus, with the pocket filter assembly as disclosed here, obstacles such as e.g. deteriorated machine operations, supplementary repair costs or machine operation ruptures may be circumvented.

According to an embodiment of the present invention, at least one filter pocket of the pre-filter unit and the filter unit have the same length, such that the at least one filter pocket of the pre-filter unit is arranged to come in contact with the end portion during operation of the pocket filter assembly. In other words, the one or more filter pockets are stretched by the air or gas flow during operation, and as the length of the filter pockets is the same as the filter unit, the filter pockets are hereby able to come into contact with the end portion during operation. As a consequence, the end portion contact, which further results in a stretching of the end portion of the filter bag, hereby impedes a bulging of the sides of the filter bag of the filter unit. The present embodiment is thereby advantageous in that it even further avoids a contact between adjacently provided filter bags, e.g. in a pocket filter arrangement. It will be appreciated that the present embodiment may be combined with the embodiment comprising the lateral support structure (e.g. comprising a lateral element) and/or the embodiment comprising the tapered filter bag (e.g. comprising a truncated pyramid shape) for a filter unit which even further enhances a separation between adjacently provided filter bags.

According to an embodiment of the present invention, there is provided a pocket filter arrangement for removing particles from an air or gas flow comprising a plurality of pocket filter assemblies according to the previously described embodiment of the present invention. The pocket filter assemblies are arranged adjacently and in a direction perpendicular to the direction of the air or gas flow. The present embodiment is advantageous in that the filter units, according to various embodiments of the present invention, are arranged to retain the shape of the filter bag and/or to avoid/prevent a bulging of the filter bags during operation. Furthermore, the filter units of the pocket filter arrangement decreases the risk of contact during operation between adjacently arranged filter bags, leading to an improved filter performance of the pocket filter arrangement. It will be appreciated that any combination of features of the various embodiment of the filter units, e.g. the lateral support structure, the resilient element(s), the lateral element(s) and/or the tapered (truncated pyramid) shape, are feasible for the filter units of the pocket filter assemblies of the pocket filter arrangement.

Further features of, and advantages with, the present invention will become apparent when studying the appended claims and the following description. Persons skilled in the art realize that different features of the present invention can be combined to create embodiments other than those described in the following.

BRIEF DESCRIPTION OF THE DRAWINGS

These and other aspects of the present invention will now be described more in detail, with reference to the appended drawings.

FIGS. 1-2 show perspective views of a filter unit in a stretched state according to an embodiment of the present invention.

DETAILED DESCRIPTION

Figure 2B:
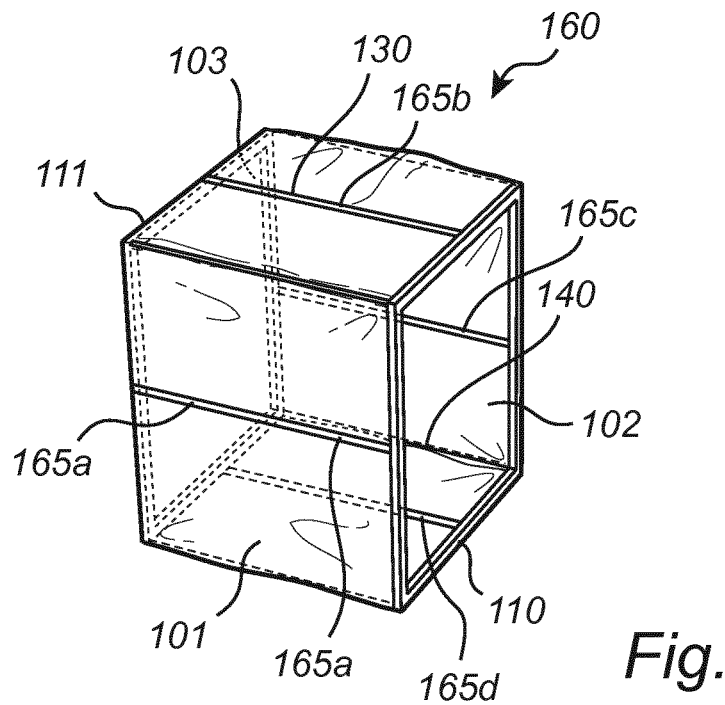

In the following description, the present invention is described with reference to a filter unit for removing particles from an air or gas flow.

FIG. 1 is a perspective view of a filter unit 100 comprising a filter bag 101 with filter material for removing particles from an air or gas flow. The filter bag 101 comprises an opening portion 102, i.e. a mouth of the filter bag 101. Opposite the opening portion 102 is arranged an end portion 103, being a portion of the bottom/closed end of the filter bag 101 and facing the opening portion 102. In FIG. 1, the opening portion 102 and the end portion 103 are substantially quadratic. A frame 110 is arranged around the periphery of the opening portion 102, the frame 110 thereby defining the opening portion 102 of the filter bag 101. The frame 110 is substantially quadratic and the plane of the frame 110 is perpendicular to the air or gas flow during operation. The frame 110 is preferably rigid, and may comprise a lightweight structure, e.g. a hollow frame, a strip, or the like. The material of the frame 110 may comprise stainless steel, plastic, wood, or the like, or even titanium. The length of a side of the frame 110 may for example be 300-1000 mm, more preferably 400-800 mm, and most preferably 550-650 mm. Furthermore, the width of the frame 110 may for example be 10-30 mm, more preferably 15-25 mm, and most preferably around 20 mm.

A support structure 111 is arranged around the periphery of the end portion 103. The support structure 111 is substantially quadratic and the plane of the support structure 111 is parallel to the frame 110, thereby also being perpendicular to the air or gas flow during operation. The support structure 111 is arranged to stretch an area 112 of the end portion 103, wherein the area 112 may be a portion of the end portion 103, or alternatively, the entire end portion 103. Here, the area 112 represents the entire end portion 103, i.e. the bottom of the filter bag 101. The support structure 111 may comprise a weld, seam, or a combination thereof, for a strengthening/stiffening of the end portion 103, thereby contributing to the stretching of the area 112. The support structure 111 may further comprise one or more reinforcing elements, e.g. a rod, or the like, for the purpose of conveniently stretching the area 112 of the end portion 103 of the filter bag 101, wherein the material of the rod may comprise metal, polymer, glass fiber, wood, cardboard, or a combination thereof. The support structure 111 may for example comprise one reinforcing element for the entire end portion 103 or e.g. four elements, one for each edge of the substantially quadratic end portion 103. The diameter of the rod may for example be 2-6 mm, more preferably 3-5 mm, and most preferably about 4 mm.

In FIG. 1, the support structure 111 is arranged within a seam of the filter material of the filter bag 101, but may alternatively be arranged at the periphery of the end portion 103 in substantially any other way.

The frame 110 and the support structure 111 of the filter unit 100 act to stretch the filter bag 101 into a substantially parallelepiped shape, in this text also referred to as a stretched state of the filter unit 100. In FIG. 1, the filter bag 101 is stretched into a substantially cubic shape by the frame 110 and the support structure 111. The filter unit 100 has the shape of a substantially cubic box, wherein the four sides and the end portion 103 are closed, and the opening portion 102 is open. The frame 110 and the support structure 111 may be rectangular/quadratic and have equal outer dimensions. Alternatively, the shapes and/or sizes of the frame 110 and the support structure 111 may vary such that the stretched state of the filter unit 100 takes on a pyramid-shape, or the like.

The stretched state of the filter unit 100 provides a free passage for one or more filter pockets 120 into and out of the filter bag 101. In FIG. 1, the one or more filter pockets 120 are represented by six filter pockets 120 being part of a pre-filter unit 300 which is arranged for insertion into the filter unit 100. Thus, the frame 110 and the support structure 111 of the filter unit 100 act to stretch the filter bag 101 into a substantially parallelepiped shape such that a free passage is provided for the filter pockets 120 insertion into and/or removal from the filter unit 100. The filter unit 100 facilitates/simplifies a filter pocket 120 insertion and/or removal during a pocket filter 120 replacement, repair, or the like, while the filter bag 101 may be retained during machine operation for filtering the air or gas flow.

In FIG. 1, the filter unit 100 further comprises a lateral support structure 130 arranged along the sides of the filter bag 101 between the opening portion 102 and the end portion 103 of the filter bag 101. Here, the lateral support structure 130 comprises four welds of the filter material of the filter bag 101, each weld being provided along the four edges of the cubic shape of the filter unit 100 between the opening portion 102 and the end portion 103. It will be appreciated that the welds may alternatively be seams of the filter material of the filter bag 101, or a combination between welds and seams. Furthermore, the lateral support structure 130 (e.g. comprising welds) may alternatively be arranged on one or more sides between the opening portion 102 and the end portion 103 of the filter bag 101. The welds/seams provide a reinforcement/stiffening of the filter material of the filter bag 101, such that the lateral support structure 130 hereby contributes to the stretching of the filter unit 100 for an even more convenient filter pocket 120 insertion/removal.

FIG. 2a shows a perspective view of a filter unit 100 in a stretched state in accordance with FIG. 1. In this embodiment of the filter unit 100, the lateral support structure 130 comprises four resilient elements 140 which are provided along the four edges of the substantially cubic structure of the filter unit 100 and which elongate between the opening portion 102 and the end portion 103 of the filter bag 101, i.e. between the frame 110 and the support structure 111. The resilient elements 140 may be substantially any flexible, springing, and/or elastic elements, e.g. springs, plastic rods, etc. Here, the resilient elements 140 are arranged in the seams of the lateral support structure 130, but may alternatively be arranged anywhere between the opening portion 102 and the end portion 103 of the filter bag 101. The resilient elements 140 even further contribute to the stretching of the filter unit 100 into the substantially parallelepiped/cubic shape, which facilitates a filter pocket insertion/removal into/from the filter unit 100. Furthermore, the resilient elements 140 mitigate a bulging deformation of the filter bag 101 during operation, i.e. bulges on the sides of the filer unit 100 in a direction perpendicular to the air or gas flow.

FIG. 2b shows a filter unit 160 which is an alternative embodiment of the filter unit 100 of FIG. 2a. Here, the filter unit 160 comprises a lateral support structure 130 which in turn comprises four lateral elements 165a-d. The lateral elements 165a-d elongate in a direction parallel to the direction of the air or gas flow, and elongate between the frame 110 and the support structure 111. Here, each lateral element 165a-d is exemplified as a one-piece element which is fastened to the frame 110 and the support structure 111 by its end portions. The four lateral elements 165a-d are further arranged on each of the four sides between the opening portion 102 and the end portion 103 of the filter bag 101, wherein each lateral element 165a-d is arranged approximately in the middle of the respective filter bag side and aligned parallel to the direction of the air or gas flow. The arrangement of one or more lateral elements 165a-d on the filter bag 101 counteracts a bulging and/or sideway flexing of the filter bag 101, wherein such a deformation may deteriorate the filtering efficiency. For example, the lateral elements 165a-d counteract a filter bag contact in a case of adjacently provided filter units 160, e.g. in a pocket filter arrangement. It will be appreciated that in a case of an arrangement of adjacently provided filter units 160 in a row/array of a plurality of filter units 160, the filter bags 101 of the filter units 160 may optionally comprise lateral elements only on the sides of adjacently provided filter bags 101 which face each other in the direction of the row/array (e.g. only lateral elements 165a, 165c).

The lateral elements 165a-d may be provided on the outside of the filter bag 101 for mitigating a sideway bulging and/or flexing of the filter bag 101. Alternatively, the lateral elements 165a-d may be provided on the inside of the filter bag 101, wherein the filter bag 101 is preferably attached to the lateral elements 165a-d, e.g. by threads, glue, or the like.

The lateral elements 165a-d may alternatively be provided within the material of the filter bag 101, e.g. in a weld of the filter bag 101.

Figure 2C:
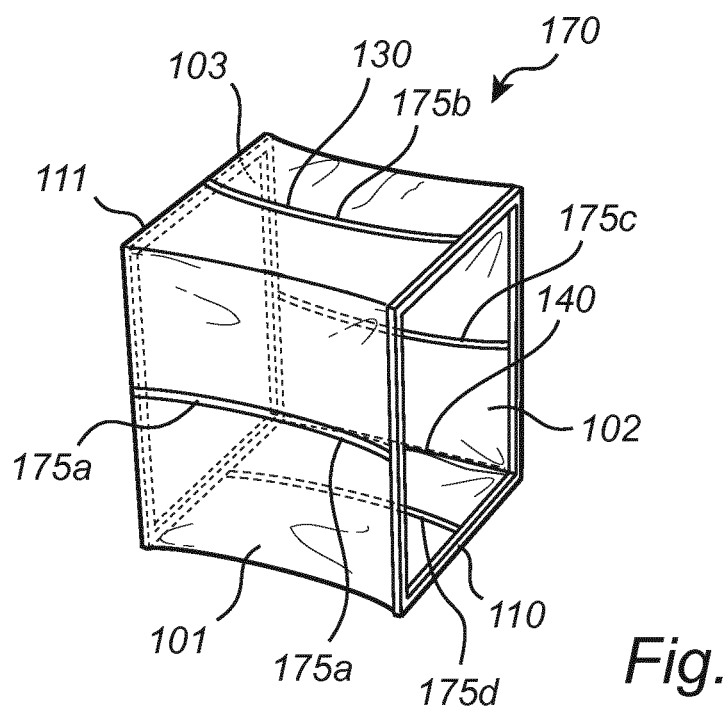

FIG. 2c shows a filter unit 170 which is an alternative embodiment of the filter units 100, 160 of FIG. 2a and FIG. 2b, respectively. Here, the lateral support structure 130 comprises four lateral elements 175a-d on each side of the filter bag 101, wherein the lateral elements 175a-d, which elongate between the frame 110 and the support structure 111, are curved. More specifically, the lateral elements 175a-d are curved towards a central, (imaginary) axis of the filter unit 170 in the direction of the air or gas flow. The lateral elements 175a-d are hereby arranged to narrow the waist (i.e. a central portion) of the substantially parallelepiped shape of the filter bag 101. The lateral elements 175a-d are hereby able to achieve a shape of the filter bag 101 which, at least to some extent, resembles that of a time-glass.

Analogously with the filter unit of FIG. 2b, it will be appreciated that in a case of an arrangement of adjacently provided filter units 170 of FIG. 2c in a row/array, the filter bags 101 of the filter units 170 may optionally comprise only lateral elements which counteract a contact of adjacently provided filter bag sides in the direction of the row/array (e.g. lateral elements 175a, 175c).

Figure 2D:
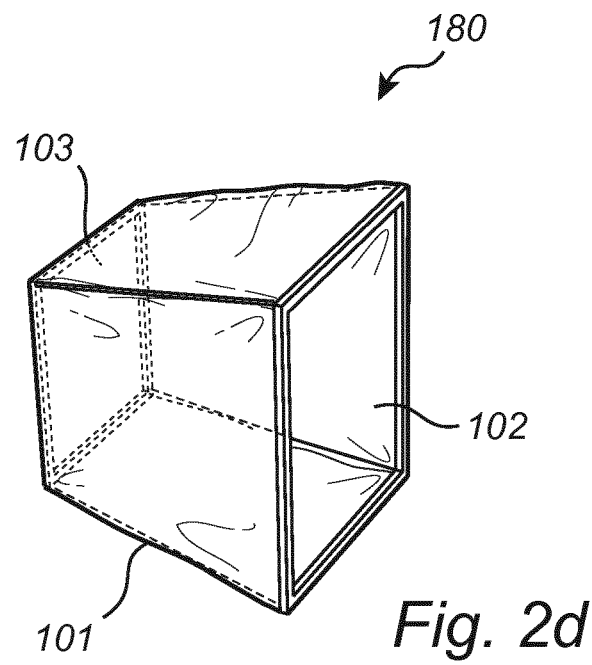

FIG. 2d shows yet another embodiment of an exemplifying filter unit 180, wherein the end portion 103 of the filter bag 101 is smaller (i.e. has a smaller area) than the opening portion 102, such that the filter bag 101 of the filter unit 180 is tapered in a direction parallel to the direction of the air or gas flow. In other words, the tapered shape of the filter bag 101 implies a decreased width of the filter bag 101 in the direction of the air or gas flow. More specifically, the filter bag 101 in FIG. 2d has a truncated pyramid shape, wherein the rectangular (e.g. quadratic) form of the smaller end portion 103 of the filter bag 101 is symmetrically arranged (i.e. each side of the filter bag 101 is equally tapered) in relation to the rectangular (e.g. quadratic) form of the larger opening portion 102 of the filter bag 101. The area of the end portion 103 of the filter bag 101 may be 70-98%, and preferably 90-98%, of the area of the opening portion 102 of the filter bag 101.

It will be appreciated that in a case of an arrangement of adjacently provided filter units 180 of FIG. 2d in a row/array, the filter bags 101 of the filter units 180 achieve wedge-formed gaps between adjacently provided filter bags 101, such that a contact between the adjacently provided filter bags 101 is efficiently counteracted during operation. It will be understood that a pre-filter unit 300, arranged for insertion into the filter unit 170 of FIG. 2c or the filter unit 180 of FIG. 2d may be shaped accordingly. In other words, a pre-filter unit 300 for insertion into the filter unit 170 having a narrowed waist may also have a shape comprising a narrowed waist for a convenient fit. Analogously, a pre-filter unit 300 for insertion into the filter unit 180 may also be tapered in a direction parallel to the direction of the air or gas flow to fit into the filter unit 180. Furthermore, it will be appreciated that one or more of the lateral elements 165a-d of the embodiment in FIG. 2b and/or one or more of the curved lateral elements 175a-d of the embodiment in FIG. 2c may be combined together with the tapered (truncated pyramid shaped) filter unit 180 of FIG. 2d. By this, the risk of contact between adjacently provided filter bags 101, e.g. due to bulging filter bag sides, may be decreased even further.

Figure 3:
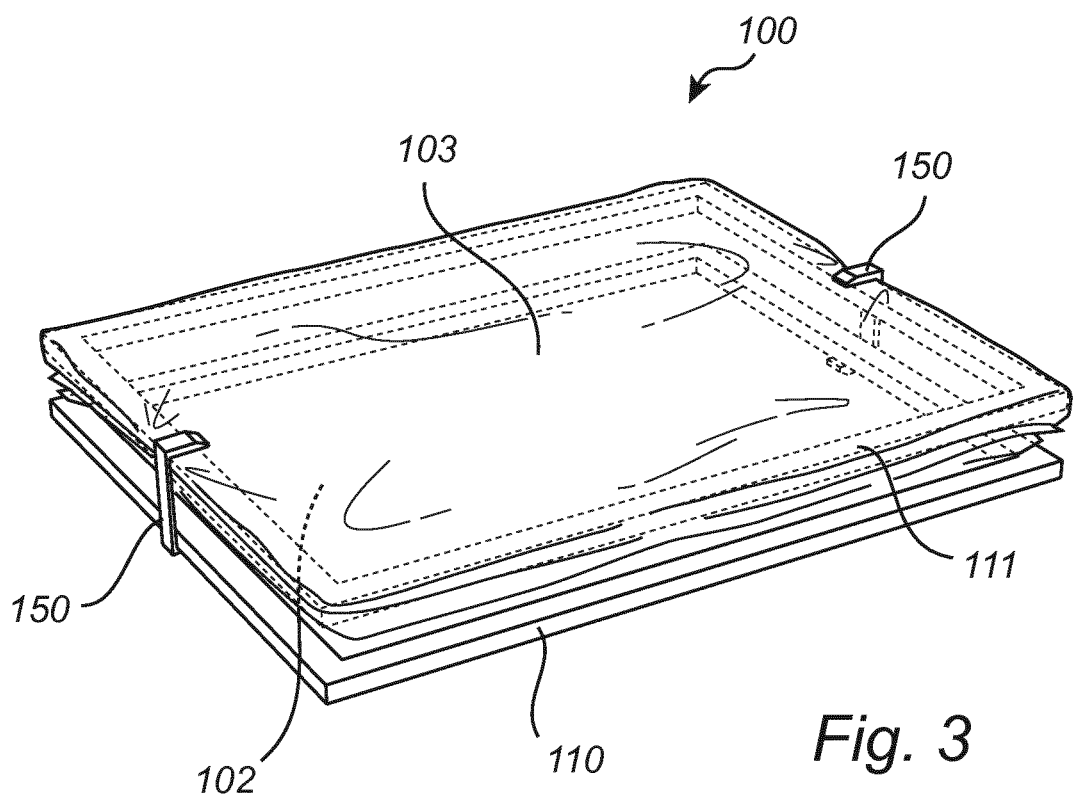
FIG. 3 shows a perspective view of a filter unit in a folded state according to an embodiment of the present invention.

FIG. 3 shows a perspective view of a filter unit 100 in a folded state. Here, the frame 110 and the support structure 111 have been brought towards each other, such that the substantially cubic shape of the filter unit 100 has been folded/compressed into a relatively flat shape. The opening portion 102 and the end portion 103 of the filter unit 100 are closely adjacent, the respective plane of the opening portion 102 and the end portion 103 facing each other. The sides of the filter bag 101 (and/or the lateral support structure 130) are folded within the outer dimensions of the frame 110 and the support structure 111, such that the sides of the filter bag 101 are sandwiched between the opening portion 102 and the end portion 103 of the filter unit 100. In this folded state of the filter unit 100, i.e. a flat shape, the filter unit 100 may be conveniently stored and/or transported.

Upon arrangement of the filter unit 100 into a machine for which the filter unit 100 is intended for filtering an air or gas flow, the filter unit 100 may be unfolded from the folded state as the air or gas flow fills the filter bag 101 of the filter unit 100 during operation. Alternatively, the lateral support structure 130 may act to stretch the sides of the filter unit 100 such that the filter unit 100, at least partially, takes on its stretched, cubic shape, even without the effect of the air or gas flow. As a further alternative, if the lateral support structure 130 comprises resilient elements 140, the resiliently biased elements 140 in the folded state of the filter unit 100 may be arranged to flex/spring back into their elongated form, and consequently stretch the filter bag 101 into its stretched state.

The filter unit 100 as shown in FIG. 3 further comprises means 150 for attaching the frame 110 to the support structure 111 in the folded state of the filter unit 100. The means 150 are provided on two parallel edges of the frame 110 and the support structure 111, but may alternatively be provided substantially anywhere (and in substantially any number) on the filter unit 100 for the purpose of attaching the frame 110 to the support structure 111. The arrangement of means 150 for attaching the frame 110 to the support structure 111 is particularly advantageous if the lateral support structure 130 comprises a resilient element 140, wherein the means 150 counteract the force from the resilient elements 140 acting to stretch the filter unit 100. The means 150 for attaching the frame 110 to the support structure 111 may alternatively be substantially any kind of fastening/attaching means or elements such as e.g. hooks, clutches, Velcro tape, etc.

Figure 4:
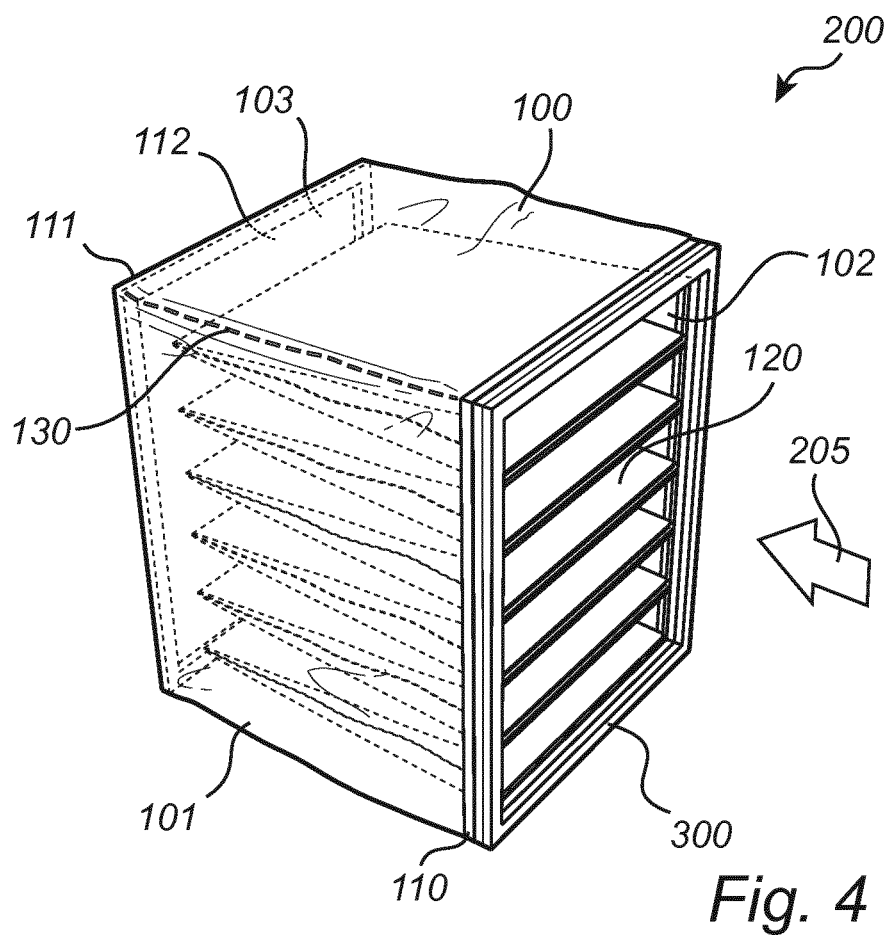
FIG. 4 shows a perspective view of a pocket filter assembly according to an embodiment of the present invention.

FIG. 4 shows a perspective view of a pocket filter assembly 200 comprising a filter unit 100 and a pre-filter unit 300 having six filter pockets 120, wherein the pre-filter unit 300 is arranged within the filter unit 100. The frame of the pre-filter unit 300 is preferably attached to the frame 110 of the filter unit 100 in an air tight or essentially air tight manner. The dimensions of the filter unit 100 and the pre-filter unit 300 are matched such that the pre-filter unit 300 is fittingly arranged within the filter bag 101 of the filter unit 100. The filter pockets 120 are arranged in parallel, wherein the filter pocket sides face each other. The filter pockets 120 are elongated substantially in the downstream direction 205 of the air or gas flow. Further, the profiles of the filter pockets 120 are v-shaped such that the circumferences of the filter pockets 120 decrease with the depths of the filter pockets 120, in the downstream direction of the air or gas flow 205. During operation, the unfiltered flow 205 enters the filter pockets 120 of the pre-filter unit 300 through the filter pocket 120 mouths, flows through the filter pockets 120 and further through the filter material of the filter unit 100.

By the pocket filter assembly 200 in FIG. 4, the filter unit 100 may be retained during machine operation, while the pre-filter unit 300 is releasably connected to the filter unit 100. The connection between the pre-filter unit 300 and the filter unit 100 may be realized by e.g. a fitting/mating connection (e.g. a snap connection) between the frame of the pre-filter unit 300 and the frame 110 of the filter unit 100. Alternatively, connecting means and/or magnets may be provided for the attachment between the frames.

The frame 110 and the support structure 111 of the filter unit 100, acting to stretch the filter bag 101, simplify the insertion/removal of the pre-filter unit 300 into/from the filter unit 100 when the pre-filter unit 300 is to be replaced and/or repaired. Furthermore, the pocket filter assembly 200 provides filter performance at machine operation also for the situation wherein the pre-filter unit 300 is removed from the pocket filter assembly 200, as the filter unit 100 may remain in the pocket filter assembly 200 for the filtering operation.

Figure 5A:
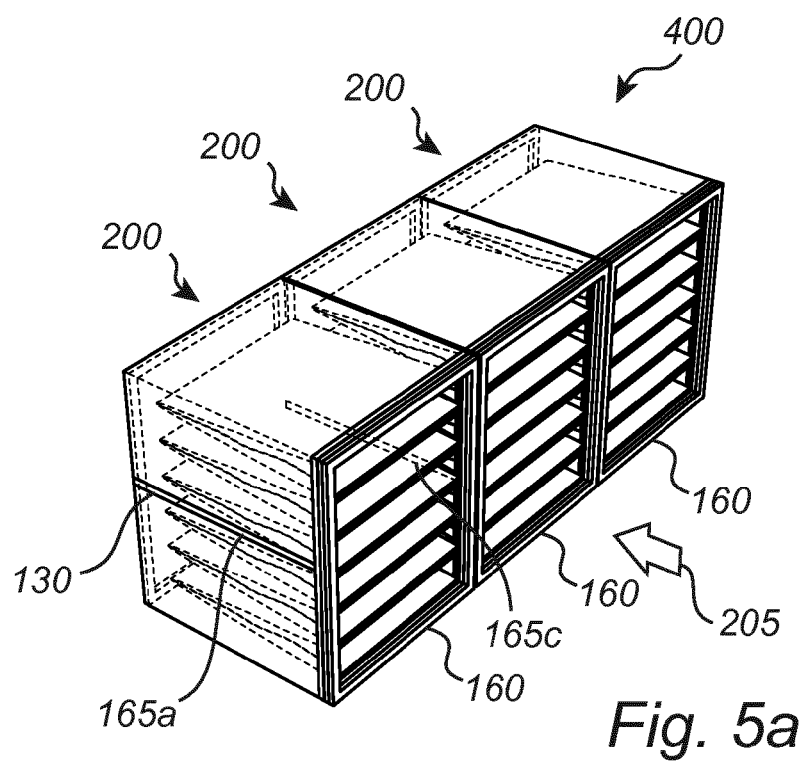
FIGS. 5a-b show perspective views of pocket filter arrangements according to embodiments of the present invention.

FIG. 5*a* shows a perspective view of a pocket filter arrangement 400 for removing particles from an air or gas flow 205. The pocket filter arrangement 400 comprises a plurality of pocket filter assemblies 200 arranged adjacently and in a direction perpendicular to the direction of the air or gas flow 205. It will be appreciated that the pocket filter assemblies 200 may be arranged in an array (i.e. side-by-side as shown in FIG. 5*a*) and/or on top of each other (e.g. in a matrix arrangement). Here, the pocket filter assemblies 200 comprise filter units 160 as exemplified in FIG. 2*b*, wherein the filter units 160 comprise lateral support structures 130 which in turn comprise two lateral elements 165*a,c* which are arranged on opposite sides of the filter bags 101. The lateral elements 165*a,c* are particularly suitable for avoiding an occurrence of bulging filter bag sides during operation, whereby the lateral elements 165*a,c* contribute to an improved filter efficiency and a decreased wear of the filter bags 101.

Figure 5B:
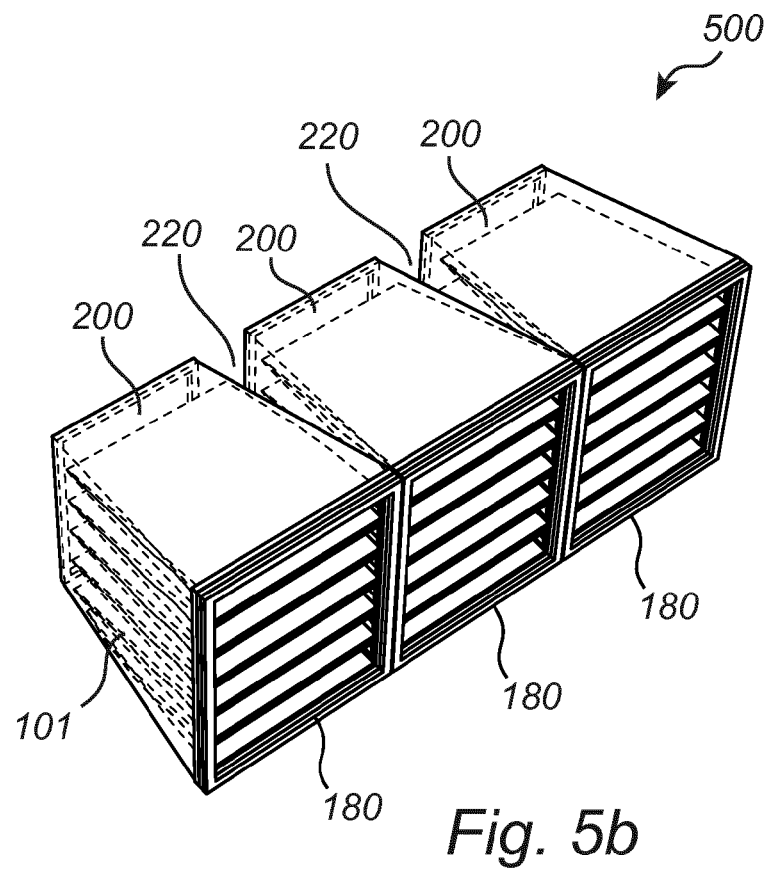

FIG. 5*b* shows a perspective view of a pocket filter arrangement 500, which is an alternative to the embodiment of the pocket filter arrangement 400 of FIG. 5*a*. Here, the pocket filter assemblies 200 comprise the exemplifying filter units 180 as shown in FIG. 2*d*. As the filter bags 101 of the filter units 180 are tapered in a direction parallel to the direction of the air or gas flow (e.g. shaped as truncated pyramids), the pocket filter arrangement 500 counteracts a contact between the sides of adjacently provided filter bags 101 during operation. This is understood by the wedge-shaped gaps 220 between adjacently provided filter bags 101, which gaps 220 are achieved by the tapered shape of the filter bags 101. The tapered (e.g. truncated pyramid shaped) filter bags 180 of the pocket filter arrangement hereby enhance the filtering efficiency. The width of the gaps 220 at their base, i.e. the distance between adjacently arranged filter bags 101 at their end portions, is dependent on the dimensions of the filter units 180. For example, the width of the gaps 220 may be 5-12 cm. It will be appreciated that the filter units 180 of the pocket filter assemblies 200 of the pocket filter arrangement 500 may further comprise one or more of the lateral elements 165*a-d* of FIG. 2*b* and/or one or more of the curved lateral elements 175*a-d* of FIG. 2*c* (not shown) for the purpose of even further mitigating a contact between adjacently provided filter bags 101 during operation. The filter bags 101 according to one or more of the preceding embodiments act to retain their shape and to avoid a bulging of the filter bag sides during operation of the pocket filter arrangement 400, which contributes to an even higher filtering efficiency and/or increased durability of the filter bags 101.

In FIGS. 4-5, the filter pockets 120 of the pre-filter units 200 and the filter units 100, 160, 180 have the same length. Hence, the filter pockets 120 are arranged to come into contact with the end portion 103 of the filter bag 101 during operation of the pocket filter arrangement 400, 500. By this, the filter pockets 120 apply a pressure on the end portion 103 of the filter bag which in turn stretches the sides of the filter bag 101. Consequently, filter pockets 200 and filter units 100, 160, 180 of the same (or approximately the same) length even further contribute to the avoidance of filter bag contact during operation of the pocket filter arrangements 400, 500.

It will be appreciated that the filter material(s) suited for the removal of particles from an air or gas flow whilst still being air or gas-permeable, may be any of, or the combination of, e.g. glass fiber, polypropylene, polyester, spun-bonded fabric or the like. However, in other embodiments, the material may be any other material for the removal of particles from an air or gas flow, e.g. textile filter materials such as rayon, nylon, polyacrylonitrile, or the like. The filter unit 100 may comprise a relatively coarse filter, e.g. G4 to standard EN779, whereas the pre-filter unit 300 may comprise a fine filter, e.g. F6. Moreover, the pre-filter unit 300 may be electrostatic.

Even though the invention has been described with reference to specific exemplifying embodiments thereof, many different alterations, modifications and the like will become apparent for those skilled in the art. The described embodiments are therefore not intended to limit the scope of the invention, as defined by the appended claims. For example, the frame 110, the support structure 111 and/or the lateral support structure 130 may be arranged at alternative positions in the filter unit 100. For example, the support structure 111 may be arranged at a more central portion of the end portion 103 than the periphery of the end portion 103, the lateral support structure(s) 130 may further be provided along the sides instead of only along the edges of the filter bag 101, etc. Furthermore, the dimensions of the filter unit 100 as disclosed may be different from those described in the text and/or shown in the figures. For example, the opening portion 102 may be larger/smaller than the end portion 103 such that the filter unit 100 in its stretched state is pyramid-shaped. It will be appreciated that the truncated filter bags 101 of the filter units 180 in FIG. 5b are not drawn to scale, and consequently, nor the gaps 220. Instead, one of the purposes of FIG. 5b is to more clearly emphasize the separation of the adjacently provided filter bags 101.

The invention claimed is:

1. A pocket filter assembly for removing particles from an air or gas flow, comprising:
 a filter unit comprising a filter bag for removing particles from an air or gas flow, wherein said filter unit is arranged to receive at least one filter pocket, said filter bag comprising an opening portion and an end portion opposite said opening portion, said filter unit further comprising
 a frame arranged at at least a portion of a periphery of said opening portion, and
 a support structure arranged at at least a portion of a periphery of said end portion for stretching an area of said end portion,
 wherein said frame and said support structure act to stretch said filter bag into a substantially parallelepiped shape such that said filter unit, in a stretched state, is arranged to provide a free passage for said at least one filter pocket into and out of said filter bag,
 wherein said filter unit is arranged to fold between said frame and said support structure into a folded state, and
 wherein said pocket filter assembly further comprises a pre-filter unit comprising at least one filter pocket arranged for insertion into said filter unit, and a releasable connection between said pre-filter unit and said filter unit, the pre-filter unit including a filter material that is finer than a filter material of the filter unit.

2. The pocket filter assembly as claimed in claim 1, wherein said filter unit further comprises a lateral support structure arranged along at least a portion of a side of said filter bag between said opening portion and said end portion.

3. The pocket filter assembly as claimed in claim 2, wherein said lateral support structure comprises at least one weld, seam, or a combination thereof, of the filter material of said filter bag.

4. The pocket filter assembly as claimed in claim 2, wherein said lateral support structure further comprises at least one resilient element.

5. The pocket filter assembly as claimed in claim 4, wherein said at least one resilient element is arranged within a seam of the filter material of said filter bag.

6. The pocket filter assembly as claimed in claim 2, wherein said lateral support structure comprises at least one lateral element which elongates in a direction parallel to the direction of the air or gas flow and elongates between said frame and said support structure.

7. The pocket filter assembly as claimed in claim 6, wherein said at least one lateral element is in one piece.

8. The pocket filter assembly as claimed in claim 6, wherein said at least one lateral element is arranged along at least one side of said filter bag.

9. The pocket filter assembly as claimed in claim 8, wherein said at least one lateral element is arranged along at least one outer side of said filter bag.

10. The pocket filter assembly as claimed in claim 8, wherein said at least one lateral element is arranged along at least one inner side of said filter bag, and wherein said filter bag is attached to said at least one lateral element.

11. The pocket filter assembly as claimed in claim 6, wherein said at least one lateral element is arranged within a seam of the filter material of said filter bag.

12. The pocket filter assembly as claimed in claim 6, wherein said at least one lateral element is curved such that said lateral element is arranged to narrow the waist of the substantially parallelepiped shape of said filter bag.

13. The pocket filter assembly as claimed in claim 6, wherein said at least one lateral element is resilient.

14. The pocket filter assembly as claimed in claim 1, wherein said support structure comprises at least one weld, seam, or a combination thereof, of the filter material of said filter bag.

15. The pocket filter assembly as claimed in claim 1, wherein said support structure comprises at least one reinforcing element arranged within a seam of the filter material of said filter bag.

16. The pocket filter assembly as claimed in claim 15, wherein said at least one reinforcing element is a rod comprising metal, polymer, fiberglass, wood, cardboard, or a combination thereof.

17. The pocket filter assembly as claimed in claim 1, wherein said frame and said support structure are rectangular and have equal outer dimensions.

18. The pocket filter assembly as claimed in claim 1, wherein said end portion is smaller than said opening portion such that said filter bag is tapered in a direction parallel to the direction of the air or gas flow.

19. The pocket filter assembly as claimed in claim 18, wherein said filter bag has a truncated pyramid shape.

20. The pocket filter assembly as claimed in claim 18, wherein the area of said end portion is 70-98% of the area of said opening portion.

21. The pocket filter assembly as claimed in claim 1, wherein said filter unit further comprises a fastener for attaching said frame to said support structure in said folded state.

22. The pocket filter assembly as claimed in claim 1, wherein said releasable connection is provided between the frame of the filter unit and a frame of the pre-filter unit.

23. The pocket filter assembly as claimed in claim 1, wherein the at least one filter pocket of said pre-filter unit and said filter unit have the same length, such that the at least one filter pocket of said pre-filter unit is arranged to come in contact with said end portion during operation of said pocket filter assembly.

24. A pocket filter arrangement for removing particles from an air or gas flow comprising a plurality of pocket filter assemblies as claimed in claim 1, wherein said pocket filter assemblies are arranged adjacently and in a direction perpendicular to the direction of the air or gas flow.

25. The pocket filter assembly as claimed in claim 19, wherein the area of said end portion is 90-98% of the area of said opening portion.

\* \* \* \* \*